(12) United States Patent
Akita et al.

(10) Patent No.: US 11,280,403 B2
(45) Date of Patent: Mar. 22, 2022

(54) CONTROL DEVICE FOR AUTOMATIC TRANSMISSION

(71) Applicant: TOYOTA JIDOSHA KABUSHIKI KAISHA, Toyota (JP)

(72) Inventors: Shingo Akita, Toyota (JP); Tomohiro Chimbe, Kariya (JP); Shingo Eto, Gamagori (JP); Nobufusa Kobayashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/318,507

(22) Filed: May 12, 2021

(65) Prior Publication Data

US 2022/0003309 A1    Jan. 6, 2022

(30) Foreign Application Priority Data

Jul. 2, 2020 (JP) .............................. JP2020-114901

(51) Int. Cl.
*F16H 61/04* (2006.01)
*F16H 61/00* (2006.01)
(Continued)

(52) U.S. Cl.
CPC ..... *F16H 61/0403* (2013.01); *F16H 61/0021* (2013.01); *F16H 61/061* (2013.01);
(Continued)

(58) Field of Classification Search
CPC ............. F16H 61/0403; F16H 61/0021; F16H 61/061; F16H 61/30; F16H 61/686;
(Continued)

(56) References Cited

U.S. PATENT DOCUMENTS 5,067,373 A * 11/1991 Kyohzuka ........... F16H 61/0213
477/98
5,810,693 A * 9/1998 Nakayama ............ F16H 61/061
477/148

(Continued)

FOREIGN PATENT DOCUMENTS

| JP | 2018-017319 A | 2/2018 | |
| JP | 2020-139586 A | 9/2020 | |
| WO | WO-2019159978 A1 * | 8/2019 | ............. F16H 59/18 |

*Primary Examiner* — Justin Holmes
(74) *Attorney, Agent, or Firm* — Oliff PLC

(57) ABSTRACT

A control device executes, when a jump-down shifting is executed, shifting control in which, after engaging elements establishing a pre-shifting gear position are released, an intermediate gear position that is a gear position between the pre-shifting gear position and a post-shifting gear position is established, and after the intermediate gear position is established, the post-shifting gear position is established. When an engaging element able to reduce a rotation speed difference between two rotating bodies connected by engaging elements establishing the intermediate gear position is regarded as a speed difference reducing element, the control device executes a pre-engaging process for generating a torque capacity in the speed difference reducing element while the shifting control is being executed and before establishing the intermediate gear position.

3 Claims, 7 Drawing Sheets

(51) Int. Cl.
*F16H 61/06* (2006.01)
*F16H 61/30* (2006.01)
*F16H 61/686* (2006.01)
*F16H 61/28* (2006.01)

(52) U.S. Cl.
CPC ........... *F16H 61/30* (2013.01); *F16H 61/686* (2013.01); *F16H 2061/0414* (2013.01); *F16H 2061/0448* (2013.01); *F16H 2061/2846* (2013.01); *F16H 2200/0069* (2013.01); *F16H 2200/2012* (2013.01); *F16H 2200/2023* (2013.01); *F16H 2200/2046* (2013.01); *F16H 2306/14* (2013.01)

(58) Field of Classification Search
CPC ..... F16H 2061/0414; F16H 2061/0448; F16H 2061/2846; F16H 2200/0069; F16H 2200/2012; F16H 2200/2023; F16H 2200/2046; F16H 2306/14
See application file for complete search history.

(56) References Cited

U.S. PATENT DOCUMENTS

| | | |
|---|---|---|
| 2018/0031122 A1 | 2/2018 | Ota et al. |
| 2018/0252310 A1* | 9/2018 | Takeichi ............... B60W 10/06 |
| 2020/0276968 A1 | 9/2020 | Chimbe et al. |

* cited by examiner

FIG. 3

|  | CLUTCH | | | | BRAKE | |
|---|---|---|---|---|---|---|
|  | C1 | C2 | C3 | C4 | B1 | B2 |
| FIRST GEAR | O | O | — | — | — | O |
| SECOND GEAR | O | — | — | — | O | O |
| THIRD GEAR | — | O | — | — | O | O |
| FOURTH GEAR | — | — | — | O | O | O |
| FIFTH GEAR | — | O | — | O | O | — |
| SIXTH GEAR | O | — | — | O | O | — |
| SEVENTH GEAR | O | — | O | O | — | — |
| EIGHTH GEAR | — | — | O | O | O | — |
| NINTH GEAR | O | — | O | — | O | — |
| TENTH GEAR | — | O | O | — | O | — |

O : ENGAGED  — : RELEASED

CONTROL DEVICE FOR AUTOMATIC TRANSMISSION

CROSS-REFERENCE TO RELATED APPLICATION

This application claims priority to Japanese Patent Application No. 2020-114901 filed on Jul. 2, 2020, incorporated herein by reference in its entirety.

BACKGROUND

1. Technical Field

The present disclosure relates to a control device for an automatic transmission.

2. Description of Related Art

For example, Japanese Unexamined Patent Application Publication No. 2018-17319 (JP 2018-17319 A) describes a planetary gear automatic transmission having a plurality of clutches and brakes that are friction engaging elements capable of switching between an engaged state and a released state, and in the automatic transmission, the gear position is changed by changing the engaging element to be brought into the engaged state, among the engaging elements.

According to the technique described in JP 2018-17319 A, in such an automatic transmission, when a jump-down shifting is executed in which the gear position is shifted to a gear position that is two or more gears lower in one shifting operation, the amount of change in the rotation speed of the input shaft of the automatic transmission before and after shifting is large and shifting shock is likely to occur compared to normal down shifting in which the gear position is shifted to a lower gear one gear at a time. Therefore, when the jump-down shifting is executed, an intermediate gear position that is a gear position between the pre-shifting gear position and the post-shifting gear position is once established, and after the intermediate gear position is established, the post-shifting gear position is established so that the occurrence of such a shifting shock is suppressed.

SUMMARY

When establishing the intermediate gear position, if the difference between rotation speeds of the two rotating bodies engaged by the engaging elements establishing the intermediate gear position is different, a shifting shock may occur. In order to suppress such a shifting shock, it is desirable to gradually engage the engaging elements so that the torque capacity of the engaging elements does not suddenly increase. However, if the engaging elements are gradually engaged, the shifting time required for establishing the intermediate gear position may become long.

A control device for an automatic transmission that solves the above problem is a control device applied to a planetary gear automatic transmission that has a plurality of friction engaging elements switchable between an engaged state and a released state, and that changes a gear position by changing an engaging element to be brought into the engaged state among the friction engaging elements. The control device executes, when a jump-down shifting is executed, shifting control in which, after engaging elements establishing a pre-shifting gear position are released, an intermediate gear position that is a gear position between the pre-shifting gear position and a post-shifting gear position is established, and after the intermediate gear position is established, the post-shifting gear position is established. When an engaging element able to reduce a rotation speed difference between two rotating bodies connected by engaging elements establishing the intermediate gear position is regarded as a speed difference reducing element, the control device executes a pre-engaging process for generating a torque capacity in the speed difference reducing element while the shifting control is being executed and before establishing the intermediate gear position.

With the above configuration, since the above-mentioned pre-engaging process is executed prior to the establishment of the intermediate gear position, the rotation speed difference of the two rotating bodies connected by the engaging elements establishing the intermediate gear position is reduced. Thus, as compared with the case where the pre-engaging process is not executed, the occurrence of a shifting shock can be suppressed even when the establishment of the intermediate gear position is started earlier. This makes it possible to shorten the shifting time of the intermediate gear position while suppressing the occurrence of a shifting shock.

In the above control device, the pre-engaging process may be executed on condition that engaging elements establishing the post-shifting gear position includes the speed difference reducing element. In the case where the pre-engaging process is executed when the engaging elements establishing the post-shifting gear position do not include the speed difference reducing element, it is necessary to control the speed difference reducing element in addition to the engaging elements necessary for establishing the post-shifting gear position. In this regard, with the above configuration, the pre-engaging process is executed on condition that the engaging elements establishing the post-shifting gear position include the speed difference reducing element. Therefore, it is possible to reduce the number of engaging elements that need to be controlled when executing the shifting control.

In the above control device, when a rotation speed of an input shaft of the automatic transmission becomes equal to or higher than a synchronous rotation speed of the intermediate gear position, a process of starting establishment of the intermediate gear position may be executed. When the rotation speed of the input shaft of the automatic transmission is equal to or higher than the synchronous rotation speed of the intermediate gear position, the rotation speed difference of the two rotating bodies whose relative rotation is regulated by the engaging elements establishing the intermediate gear position is small enough to suppress the occurrence of a shifting shock. Thus, in the above configuration, the establishment of the intermediate gear position is started when a rotation speed of an input shaft of the automatic transmission becomes equal to or higher than a synchronous rotation speed of the intermediate gear position. Therefore, the occurrence of a shifting shock when establishing the intermediate gear position can be further suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a table showing the relationship between each gear position and the state of engaging elements in the automatic transmission of the same embodiment;

DETAILED DESCRIPTION OF EMBODIMENTS

Figure 1:
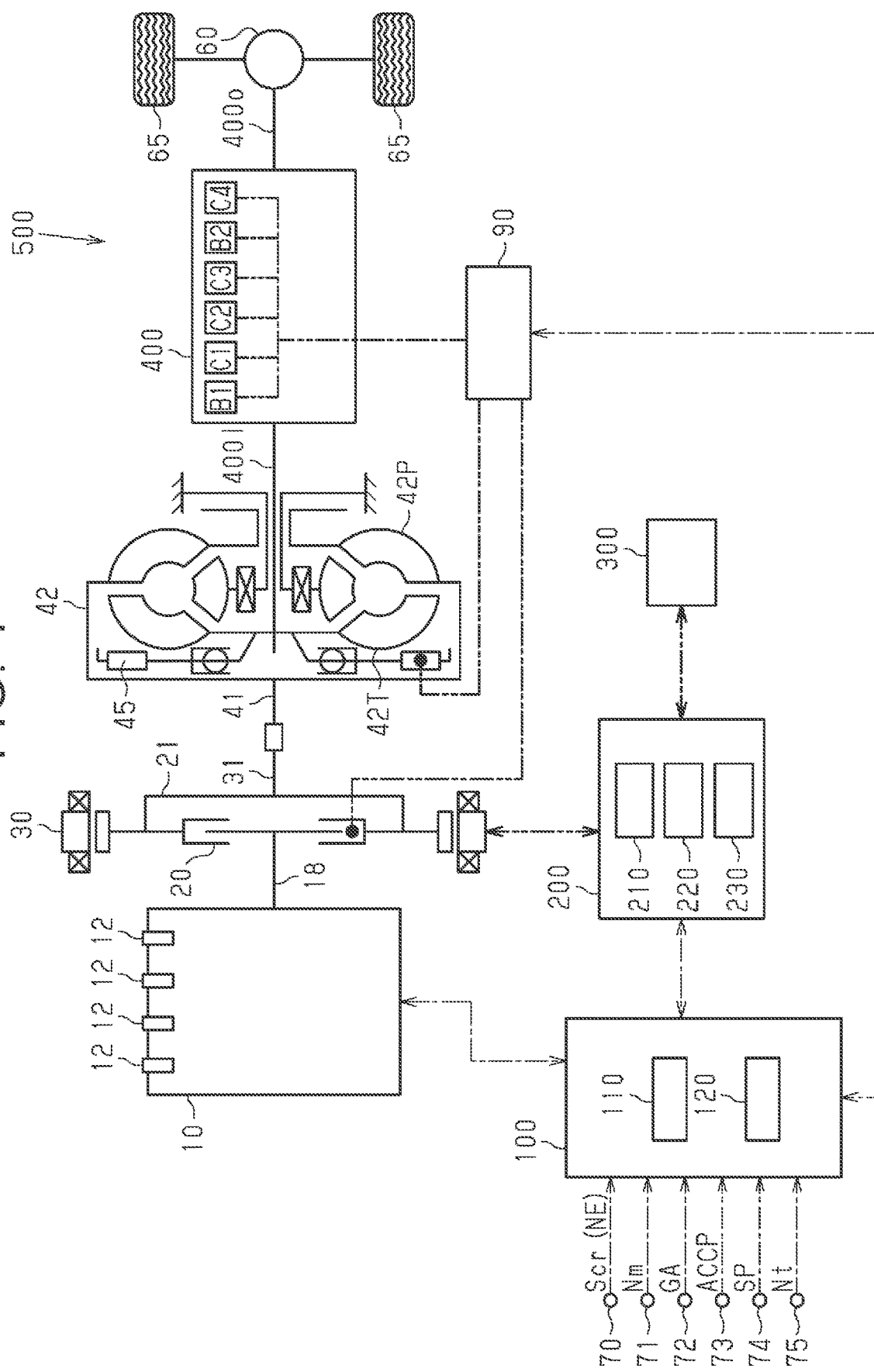
FIG. 1 is a schematic view of a vehicle including a control device for an automatic transmission according to an embodiment.

Hereinafter, an embodiment of a control device for an automatic transmission will be described with reference to FIGS. 1 to 7. As shown in FIG. 1, a vehicle 500 is configured as a hybrid vehicle equipped with two prime movers such as an internal combustion engine 10 and an electric motor 30. The internal combustion engine 10 includes fuel injection valves 12 that supply fuel to cylinders. In the combustion chamber of the internal combustion engine 10, engine output is obtained by burning the air-fuel mixture of the intake air and the fuel injected from the fuel injection valves 12.

A crankshaft 18, which is the output shaft of the internal combustion engine 10, is connected to an output shaft 31 of the electric motor 30 via a clutch mechanism 20. The output shaft 31 of the electric motor 30 is connected to an output shaft 21 of the clutch mechanism 20.

When the clutch mechanism 20 is in the engaged state, the crankshaft 18 and the output shaft 31 of the electric motor 30 are connected, and when the clutch mechanism 20 is in the released state, the crankshaft 18 and the output shaft 31 of the electric motor 30 are disconnected.

The electric motor 30 transfers electric power to and from a high-voltage battery 300 for traveling via a power control unit (PCU) 200. The PCU 200 includes units such as a boost converter 210 that boosts and outputs the direct current (DC) voltage input from the high-voltage battery 300, an inverter 220 that converts the DC voltage boosted by the boost converter 210 into the alternating current (AC) voltage and outputs the AC voltage to the electric motor 30, and a direct current-to-direct current (DC-DC) converter 230 that lowers the DC voltage of the high-voltage battery 300 to a voltage for driving an auxiliary machine. Further, the PCU 200 detects the charge rate (SOC) of the high-voltage battery 300 (SOC=remaining capacity of the battery [Ah]/full charge capacity of the battery [Ah]×100%).

The output shaft 21 of the clutch mechanism 20 is connected to an input shaft 41 of a torque converter 42 having a lockup clutch 45. The input shaft 41 is connected to the crankshaft 18 via the clutch mechanism 20. Further, the output shaft of the torque converter 42 is connected to an input shaft 400i of an automatic transmission 400.

The torque converter 42 includes a pump impeller 42P connected to the input shaft 41 and a turbine impeller 42T connected to the input shaft 400i of the automatic transmission 400. In this torque converter 42, torque is transmitted between the pump impeller 42P and the turbine impeller 42T via the automatic transmission fluid (ATF) that is a fluid, so that the torque is transmitted between the input shaft and the output shaft of the torque converter 42.

The automatic transmission 400 is a planetary gear multi-stage transmission having a well-known structure, and has a plurality of planetary gear mechanisms, four clutches C1 to C4 and two brakes B1 and B2, which are friction engaging elements capable of switching between an engaged state and a released state. The gear position is changed by changing the engaging elements to be brought into the engaged state among those engaging elements.

An output shaft 400o of the automatic transmission 400 is connected to the differential gear 60. Drive wheels 65 of the vehicle 500 are connected to the output shaft of the differential gear 60. The operations of the clutches C1 to C4 and the brakes B1 and B2 of the automatic transmission 400, the operation of the lockup clutch 45, and the operation of the clutch mechanism 20 are performed by controlling a hydraulic circuit 90 to which hydraulic oil is supplied from an oil pump (not shown). When starting the supply of hydraulic pressure to the engaging elements (clutches C1 to C4 and the brakes B1 and B2) of the automatic transmission 400 in which the supply of the hydraulic pressure is stopped, a well-known quick apply control is executed that temporarily increases the hydraulic pressure supplied to the engaging elements so that the hydraulic oil is promptly applied to the engaging elements.

Various controls such as control of the internal combustion engine 10, control of the electric motor 30, control of the hydraulic circuit 90 that controls the clutch mechanism 20, the lockup clutch 45, and the automatic transmission 400 are executed by the control device 100 mounted on the vehicle 500.

The control device 100 includes a central processing unit (hereinafter referred to as CPU) 110, a memory 120 in which control programs and data are stored, and the like. The CPU 110 executes the program stored in the memory 120 to execute various controls. Although not shown, the control device 100 is composed of a plurality of control units such as a control unit for an internal combustion engine, a control unit for a PCU, and a control unit for an automatic transmission.

A crank angle sensor 70 that detects the rotation angle of the crankshaft 18, a rotation speed sensor 71 that detects the motor rotation speed Nm that is the rotation speed of the electric motor 30, and an air flow meter 72 that detects an intake air amount GA of the internal combustion engine 10 are connected to the control device 100, and output signals from these various sensors are input to the control device 100. Further, an accelerator position sensor 73 that detects the accelerator operation amount ACCP that is the operation amount of the accelerator pedal, a vehicle speed sensor 74 that detects the vehicle speed SP of the vehicle 500, and a rotation speed sensor 75 that detects the turbine rotation speed Nt that is the rotation speed of the turbine impeller 42T are connected to the control device 100, and output signals from these various sensors are input to the control device 100. The control device 100 calculates the engine rotation speed NE based on the output signal Scr of the crank angle sensor 70. Further, the control device 100 calculates the engine load factor KL based on the engine rotation speed NE and the intake air amount GA.

The control device 100 causes the vehicle 500 to travel in any of the motor traveling mode, the hybrid traveling mode, and the engine traveling mode. In the motor traveling mode, the control device 100 releases the clutch mechanism 20 to rotate the drive wheels 65 with the power of the electric motor 30. In the hybrid traveling mode, the control device 100 engages the clutch mechanism 20 to rotate the drive wheels 65 with the power of the internal combustion engine 10 and the electric motor 30. In the engine traveling mode, the control device 100 engages the clutch mechanism 20 to rotate the drive wheels 65 with the power of the internal combustion engine 10.

Figure 2:
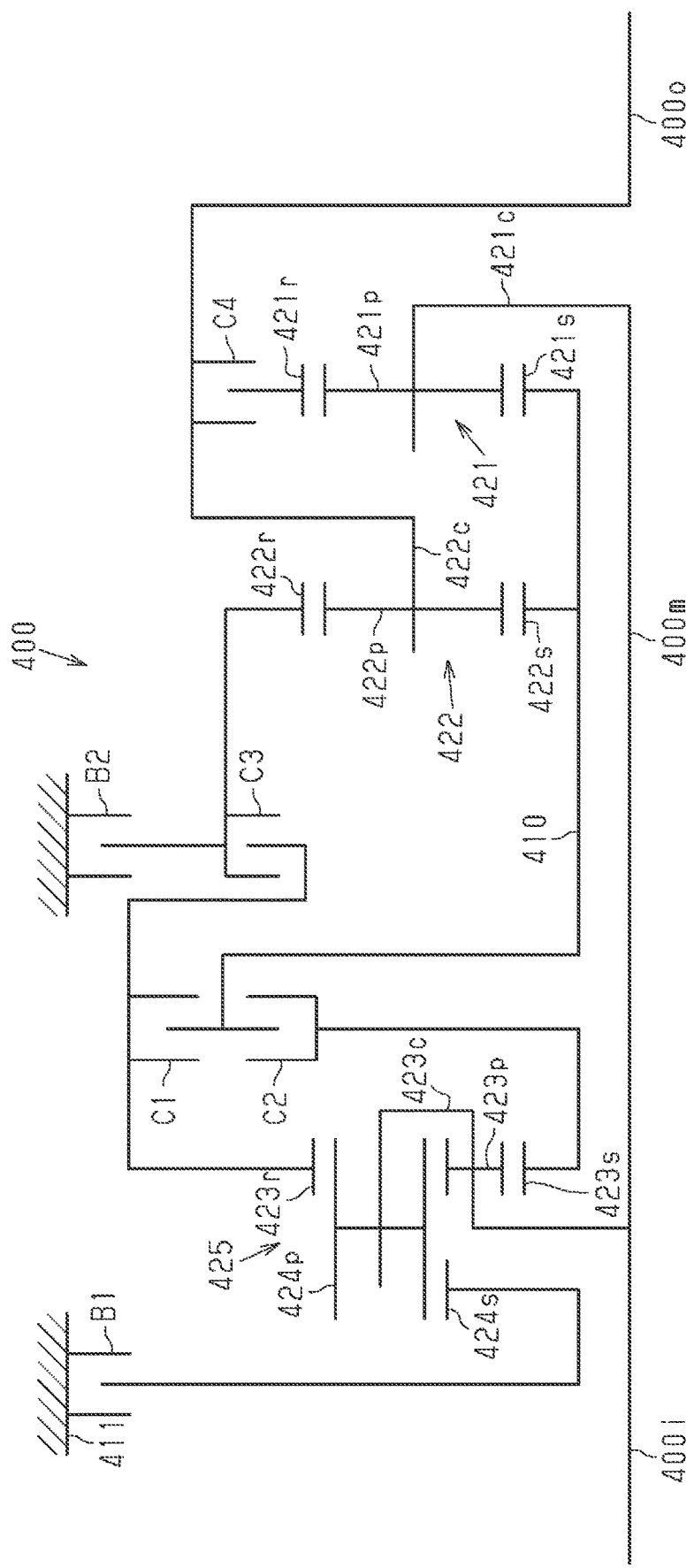
FIG. 2 is a schematic view showing an internal structure of the automatic transmission according to the same embodiment.

FIG. 2 shows the structure of the automatic transmission 400. The automatic transmission 400 is configured as, for example, a 10-speed transmission, and includes the input shaft 400$i$, the output shaft 400$o$, a single pinion first planetary gear 421 and a single pinion second planetary gear 422 that are arranged side by side in the axial direction of the input shaft 400$i$ and the output shaft 400$o$, and a Ravigneaux planetary gear mechanism 425 as a composite planetary gear mechanism composed of a combination of a double pinion planetary gear and a single pinion planetary gear.

Further, the automatic transmission 400 includes the above-mentioned four clutches C1 to C4 and two brakes B1 and B2 as engaging elements for changing the power transmission path from the input shaft 400$i$ to the output shaft 400$o$.

The first planetary gear 421, the second planetary gear 422, and the Ravigneaux planetary gear mechanism 425 are arranged in a transmission case 411 so as to be arranged in the order of the Ravigneaux planetary gear mechanism 425, the second planetary gear 422, and the first planetary gear 421 from the internal combustion engine 10 side (left side in FIG. 1). Accordingly, the Ravigneaux planetary gear mechanism 425 is arranged so as to be close to the torque converter 42, the first planetary gear 421 is arranged so as to be close to the output shaft 400$o$, and the second planetary gear 422 is arranged between the Ravigneaux planetary gear mechanism 425 and the first planetary gear 421.

The first planetary gear 421 includes a first sun gear 421$s$ that is an external gear, a first ring gear 421$r$ that is an internal gear arranged concentrically with the first sun gear 421$s$, a plurality of first pinion gears 421$p$ that mesh with the first sun gear 421$s$ and the first ring gear 421$r$, and a first carrier 421$c$ that holds the first pinion gears 421$p$ such that the first pinion gears 421$p$ rotate and revolve.

As shown in FIG. 2, the first carrier 421$c$ of the first planetary gear 421 is always connected to an intermediate shaft 400$m$ of the automatic transmission 400, which is connected to the input shaft 400$i$. Accordingly, when the power is transmitted from the prime mover to the input shaft 400$i$, the power from the prime mover is always transmitted to the first carrier 421$c$ via the input shaft 400$i$ and the intermediate shaft 400$m$.

The first carrier 421$c$ functions as an input element of the first planetary gear 421 (first input element of the automatic transmission 400) when the clutch C4 is engaged, and idles when the clutch C4 is released. Further, the first ring gear 421$r$ functions as an output element of the first planetary gear 421 (first output element of the automatic transmission 400) when the clutch C4 is engaged.

The second planetary gear 422 includes a second sun gear 422$s$ that is an external gear, a second ring gear 422$r$ that is an internal gear arranged concentrically with the second sun gear 422$s$, a plurality of second pinion gears 422$p$ that mesh with the second sun gear 422$s$ and the second ring gear 422$r$, and a second carrier 422$c$ that holds the second pinion gears 422$p$ such that the second pinion gears 422$p$ rotate and revolve.

The second sun gear 422$s$ of the second planetary gear 422 and the first sun gear 421$s$ of the first planetary gear 421 are fixed to an intermediate member 410 that is a rotating body, whereby the second sun gear 422$s$ always rotates or stops integrally with the first sun gear 421$s$.

Further, the second carrier 422$c$ of the second planetary gear 422 is always connected to the output shaft 400$o$, and always rotates or stops integrally with the output shaft 400$o$. Accordingly, the second carrier 422$c$ functions as an output element of the second planetary gear 422 (second output element of the automatic transmission 400). Further, the second ring gear 422$r$ of the second planetary gear 422 functions as a fixable element of the second planetary gear 422 (first fixable element of the automatic transmission 400).

The Ravigneaux planetary gear mechanism 425 includes a third sun gear 423$s$ and a fourth sun gear 424$s$ that are external gears, a third ring gear 423$r$ that is an internal gear arranged concentrically with the third sun gear 423$s$, a plurality of third pinion gears (short pinion gears) 423$p$ that mesh with the third sun gear 423$s$, a plurality of fourth pinion gears (long pinion gears) 424$p$ that mesh with the fourth sun gear 424$s$ and the third pinion gears 423$p$ as well as the third ring gear 423$r$, and a third carrier 423$c$ that holds the third pinion gears 423$p$ and the fourth pinion gears 424$p$ such the third pinion gears 423$p$ and the fourth pinion gears 424$p$ rotate and revolve.

The Ravigneaux planetary gear mechanism 425 is a composite planetary gear mechanism constituted by combining a double pinion planetary gear (third planetary gear) and a single pinion planetary gear (fourth planetary gear). That is, the third sun gear 423$s$, the third carrier 423$c$, the third pinion gear 423$p$ and the fourth pinion gear 424$p$, and the third ring gear 423$r$ of the Ravigneaux planetary gear mechanism 425 constitute a double pinion third planetary gear. Further, the fourth sun gear 424$s$, the third carrier 423$c$, the fourth pinion gear 424$p$, and the third ring gear 423$r$ of the Ravigneaux planetary gear mechanism 425 constitute a single pinion fourth planetary gear.

Among the rotating elements constituting the Ravigneaux planetary gear mechanism 425 (third planetary gear and fourth planetary gear), the fourth sun gear 424$s$ functions as a fixable element of the Ravigneaux planetary gear mechanism 425 (the second fixable element of the automatic transmission 400).

Further, the third carrier 423$c$ is always connected to the input shaft 400$i$ and is always connected to the first carrier 421$c$ of the first planetary gear 421 via the intermediate shaft 400$m$. Accordingly, when the power is transmitted from the prime mover to the input shaft 400$i$, the power from the prime mover is always transmitted to the third carrier 423$c$ via the input shaft 400$i$. Therefore, the third carrier 423$c$ functions as an input element of the Ravigneaux planetary gear mechanism 425 (second input element of the automatic transmission 400). Further, the third ring gear 423$r$ functions as a first output element of the Ravigneaux planetary gear mechanism 425, and the third sun gear 423$s$ functions as a second output element of the Ravigneaux planetary gear mechanism 425.

The clutch C1 is an engaging element that connects and disconnects the first sun gear 421$s$ of the first planetary gear 421 and the second sun gear 422$s$ of the second planetary gear 422 fixed to the intermediate member 410, and the third ring gear 423$r$ that is the first output element of the Ravigneaux planetary gear mechanism 425. The clutch C1 is arranged between the second planetary gear 422 and the Ravigneaux planetary gear mechanism 425 so as to be close to the Ravigneaux planetary gear mechanism 425 (third planetary gear).

The clutch C2 is an engaging element that connects and disconnects the first sun gear 421s of the first planetary gear 421 and the second sun gear 422s of the second planetary gear 422 fixed to the intermediate member 410, and the third sun gear 423s that is the second output element of the Ravigneaux planetary gear mechanism 425. The clutch C2 is arranged between the second planetary gear 422 and the Ravigneaux planetary gear mechanism 425 so as to be close to the Ravigneaux planetary gear mechanism 425 (third planetary gear).

The clutch C3 is an engaging element that connects and disconnects the second ring gear 422r of the second planetary gear 422 and the third ring gear 423r that is the first output element of the Ravigneaux planetary gear mechanism 425. The clutch C3 is arranged between the second planetary gear 422 and the Ravigneaux planetary gear mechanism 425 so as to be close to the second planetary gear 422.

The clutch C4 is an engaging element that connects and disconnects the first ring gear 421r that is the output element of the first planetary gear 421 and the output shaft 400o. The clutch C4 is arranged at a position closest to the output shaft 400o among the four clutches C1 to C4 and the two brakes B1 and B2.

The brake B1 is an engaging element that fixes the fourth sun gear 424s, which is the fixable element of the Ravigneaux planetary gear mechanism 425, to the transmission case 411 so that the fourth sun gear 424s is not rotatable with respect to the transmission case 411, and that releases the fourth sun gear 424s so that the fourth sun gear 424s is rotatable with respect to the transmission case 411. The brake B1 is arranged at a position closest to the torque converter 42 among the four clutches C1 to C4 and the two brakes B1 and B2.

The brake B2 is an engaging element that fixes the second ring gear 422r, which is the fixable element of the second planetary gear 422, to the transmission case 411 so that the second ring gear 422r is not rotatable with respect to the transmission case 411, and that releases the second ring gear 422r so that the second ring gear 422r is rotatable with respect to the transmission case 411. The brake B2 is arranged between the second planetary gear 422 and the Ravigneaux planetary gear mechanism 425.

FIG. 3 shows the relationship between the gear positions for forward traveling established by the automatic transmission 400 and the states of the engaging elements. The larger the number indicating the gear position (for example, "1" in the first gear), the smaller the gear ratio of the gear position. Further, in the following, the engaging elements to be engaged in order to establish n gear ($1 \leq n \leq 10$) are referred to as engaging elements establishing the n gear.

The engaging elements that establish the first gear with the largest gear ratio, that is, the engaging elements that are brought into an engaged state to establish the first gear, are the clutch C1, the clutch C2, and the brake B2, and the remaining engagement elements, namely, the clutch C3, the clutch C4, and the brake B1 are brought into a released state.

The engaging elements that are brought into an engaged state to establish the second gear are the clutch C1, the brake B1, and the brake B2, and the remaining engaging elements, namely, the clutch C2, the clutch C3, and the clutch C4 are brought into a released state.

The engaging elements that are brought into an engaged state to establish the third gear are the clutch C2, the brake B1, and the brake B2, and the remaining engaging elements, namely, the clutch C1, the clutch C3, and the clutch C4 are brought into a released state.

The engaging elements that are brought into an engaged state to establish the fourth gear are the clutch C4, the brake B1, and the brake B2, and the remaining engaging elements, namely, the clutch C1, the clutch C2, and the clutch C3 are brought into a released state.

The engaging elements that are brought into an engaged state to establish the fifth gear are the clutch C2, the clutch C4, and the brake B1, and the remaining engaging elements, namely, the clutch C1, the clutch C3, and the brake B2 are brought into a released state.

The engaging elements that are brought into an engaged state to establish the sixth gear are the clutch C1, the clutch C4, and the brake B1, and the remaining engaging elements, namely, the clutch C2, the clutch C3, and the brake B2 are brought into a released state.

The engaging elements that are brought into an engaged state to establish the seventh gear are the clutch C1, the clutch C3, and the clutch C4, and the remaining engaging elements, namely, the clutch C2, the brake B1, and the brake B2, are brought into a released state.

The engaging elements that are brought into an engaged state to establish the eighth gear are the clutch C3, the clutch C4, and the brake B1, and the remaining engaging elements, namely, the clutch C1, the clutch C2, and the brake B2 are brought into a released state.

The engaging elements that are brought into an engaged state to establish the ninth gear are the clutch C1, the clutch C3, and the brake B1, and the remaining engaging elements, namely, the clutch C2, the clutch C4, and the brake B2 are brought into a released state.

The engaging elements that are brought into an engaged state to establish the tenth gear with the smallest gear ratio are the clutch C2, the clutch C3, and the brake B1, and the remaining engaging elements, namely, the clutch C1, the clutch C4, and the brake B2 are brought into a released state.

As described above, in the present embodiment, the gear position is established by bringing three of the plurality of engaging elements into the engaged state. Then, by changing one of the three engaging elements in the engaged state to another engaging element, the gear position is changed to a gear position that is one gear higher (for example, from fourth gear to fifth gear, etc.) and a gear position that is one gear lower (for example, from fourth gear to third gear).

When performing a jump-down shifting that shifts to a gear position that is two or more gears lower in one shifting operation (for example, shifting from fourth gear to second gear, shifting from eighth gear to third gear, etc.), two of the three engaging elements in the engaged state are changed to other engaging elements. Situations in which such a jump-down shifting is executed include a case where the acceleration request from the vehicle driver is extremely high, specifically, for example, a kick-down shifting is performed with a large depression on the accelerator pedal.

Further, in the case of a vehicle having a manual shift mode in which the gear position can be switched based on the operation of the shift-up switch or the shift-down switch by the vehicle driver, the above situations include a case where the shift-down switch is continuously operated so that the above jump-down shifting is required.

Here, when the above-mentioned jump-down shifting is executed, the amount of change in the rotation speed of the input shaft of the automatic transmission 400 before and after the shifting operation becomes large, and a shifting shock is likely to occur. Therefore, in the present embodiment, when the jump-down shifting is executed, shifting control is executed in which, after a plurality of engaging elements establishing the pre-shifting gear position is released, an intermediate gear position that is a gear position between the pre-shifting gear position and the post-shifting gear position is established, and after the intermediate gear position is established, the post-shifting gear position is established. In the present embodiment, a gear position in which two of the three engaging elements establishing the post-shifting gear position are the same and the remaining engaging element is different is set as the intermediate gear position. Further, as the intermediate gear position, various gear positions are set in advance according to the combination of the pre-shifting gear position and the post-shifting gear position.

Figure 4:
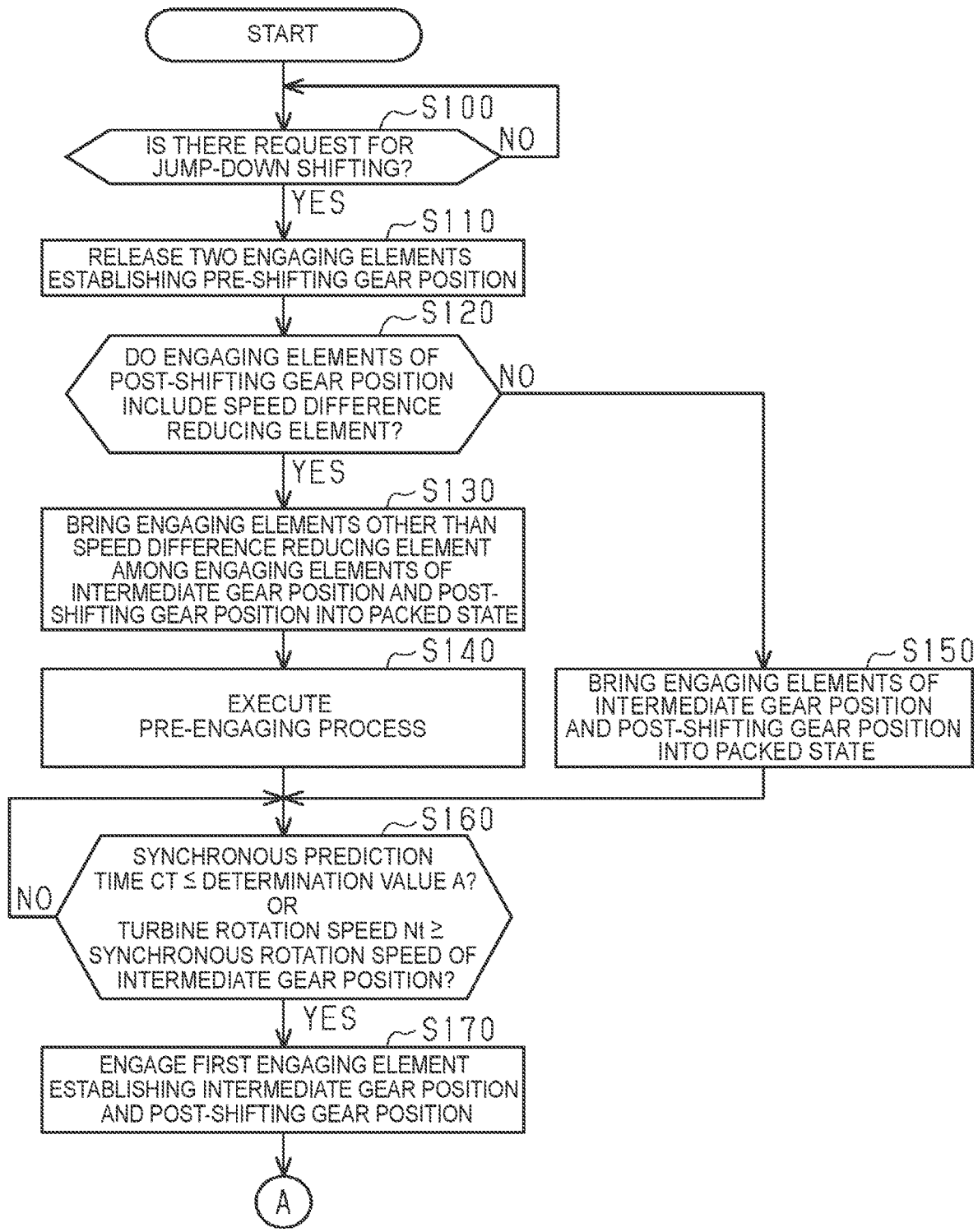
FIG. 4 is a flowchart showing a procedure of a process executed by the control device of the same embodiment.
Figure 5:
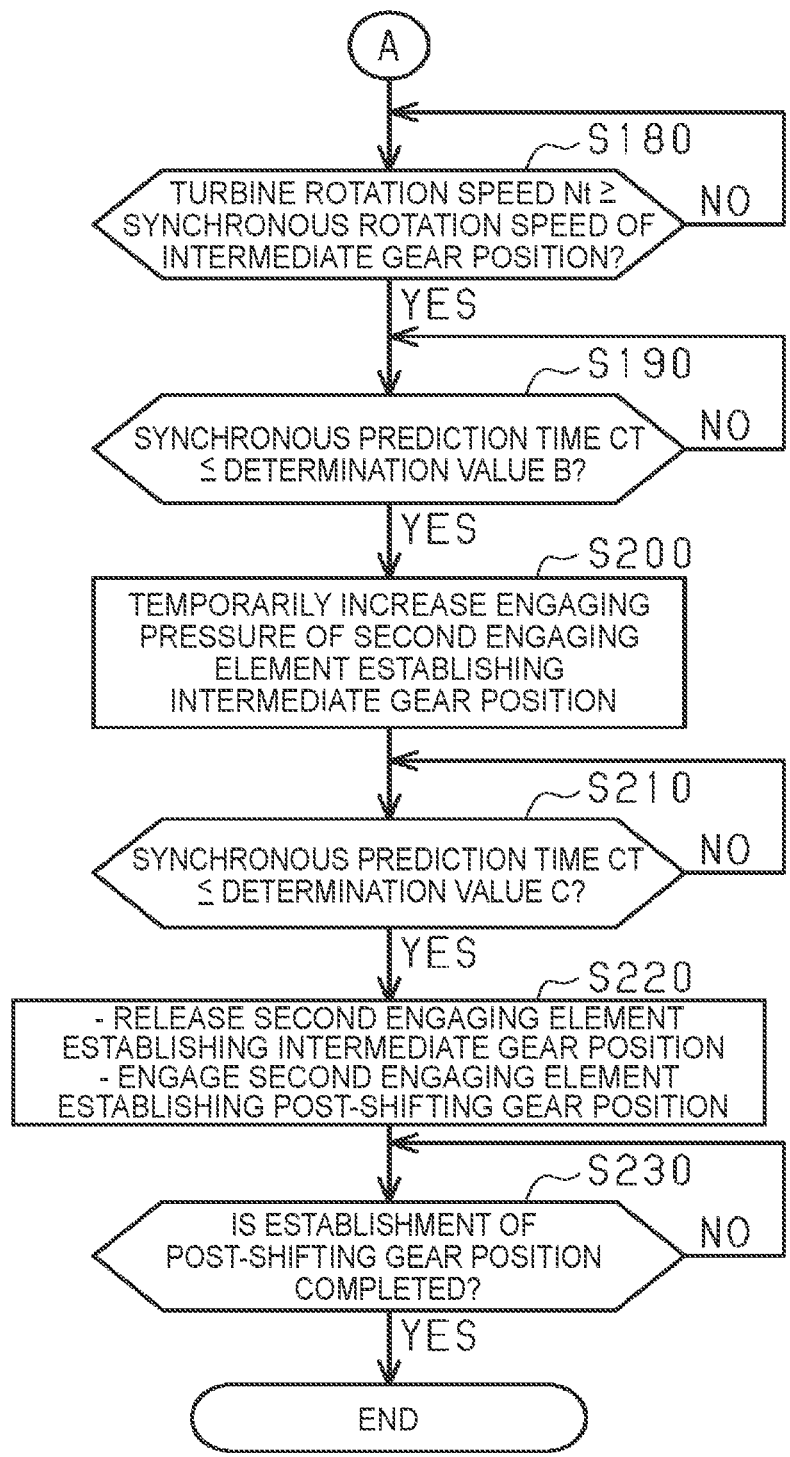
FIG. 5 is a flowchart showing a procedure of the process executed by the control device of the same embodiment.

Hereinafter, the process executed by the control device 100 in order to execute the jump-down shifting while the vehicle is traveling will be described with reference to FIGS. 4 and 5. The jump-down shifting process shown in FIGS. 4 and 5 is realized when the CPU 110 executes the program stored in the memory 120 of the control device 100. Further, in the following, the step number is represented by a number with "S" added at the beginning.

When the present process shown in FIG. 4 is started, the control device 100 determines whether there is a request for the above-mentioned jump-down shifting (S100). The control device 100 repeatedly executes the process of S100 until it is determined that there is a request for the jump-down shifting.

When it is determined that there is a request for the jump-down shifting (S100: YES), the control device 100 executes a process of releasing two engaging elements establishing the pre-shifting gear position (S110). In S110, when the two engaging elements to be released are not the engaging elements establishing the intermediate gear position, both of the two engaging elements are completely released. Note that to completely release means that the supply of hydraulic pressure to the engaging element is stopped to bring the engaging element into a completely released state. On the other hand, when one of the two engaging elements to be released is an engaging element establishing the intermediate gear position, the engaging element establishing the intermediate gear position is released and is brought into a packed state, while the other engaging element of the two engaging elements to be released is completely released. The packed state is a state immediately before the friction members of the engaging elements come into contact with each other and a state where the torque capacity is substantially "zero".

Next, the control device 100 determines whether the engaging elements of the post-shifting gear position include a speed difference reducing element (S120). The speed difference reducing element is an engaging element capable of reducing the rotation speed difference between the two rotating bodies engaged by the engaging elements establishing the intermediate gear position, and in the present embodiment, as described later, the brake B2 corresponds to this speed difference reducing element.

When it is determined in S120 that the engaging elements of the post-shifting gear position include the speed difference reducing element (S120: YES), the control device 100 executes a process of bringing the engaging elements other than the speed difference reducing element among the engaging elements of the intermediate gear position and the engaging elements of the post-shifting gear position into the packed state (S130).

Next, the control device 100 executes a pre-engaging process (S140). In this pre-engaging process, the control device 100 generates a torque capacity in the speed difference reducing element by setting a specified engaging pressure Kp predetermined as an indicated pressure Cp of the hydraulic pressure to be supplied to the speed difference reducing element. When a torque capacity is generated in the speed difference reducing element in this way, the rotation speed difference between the two rotating bodies engaged by the engaging elements establishing the intermediate gear position is reduced. The specified engaging pressure Kp is preset to a suitable value capable of quickly reducing the rotation speed difference between the two rotating bodies while suppressing the occurrence of a shifting shock due to the engagement of the speed difference reducing element. When the pre-engaging process is executed, the above-mentioned quick apply control is first performed on the speed difference reducing element.

Next, the control device 100 executes a process of bringing the engaging elements other than the speed difference reducing element among the engaging elements of the intermediate gear position and the engaging elements of the post-shifting gear position into the packed state (S140). On the other hand, when it is determined in S120 that the engaging elements of the post-shifting gear position do not include the speed difference reducing element (S120: NO), the control device 100 executes a process of bringing all of the engaging elements of the intermediate gear position and the engaging elements of the post-shifting gear position into the packed state (S150). When the engaging elements are brought into the packed state in S140 or S150, the quick apply control described above is first performed.

When the process of S140 or the process of S150 is executed in this way, the control device 100 executes the process of S160 described below. In S160, the control device 100 determines whether any of the following conditions (A) and (B) is satisfied (S160).

Condition (A): The synchronous prediction time CT is equal to or less than the determination value A.

Condition (B): The turbine rotation speed Nt is equal to or higher than the synchronous rotation speed of the intermediate gear position.

The synchronous prediction time CT in Condition (A) is a predicted time required for the current turbine rotation speed Nt to reach the synchronous rotation speed of the post-shifting gear position, and is calculated by the control device 100 based on the rate of change in the turbine rotation speed Nt during the shifting operation and the current turbine rotation speed Nt. Further, the magnitude of the determination value A is preset so that it can be appropriately determined that the timing is suitable for starting the engagement of the first engaging element necessary for establishing the intermediate gear position and the post-shifting gear position based on the fact that the synchronous prediction time CT has become equal to or less than the determination value A.

Then, the control device 100 repeatedly executes the process of S160 until either Condition (A) or Condition (B) is satisfied. When it is determined in S160 that either Condition (A) or Condition (B) described above is satisfied (S160: YES), the control device 100 executes the process of engaging the first engaging element necessary for establishing the intermediate gear position and the post-shifting gear position (S170).

As shown in FIG. 5, after executing the process of S170, the control device 100 determines whether the turbine rotation speed Nt has become equal to or higher than the synchronous rotation speed of the intermediate gear position (S180). Then, the control device 100 repeatedly executes the process of S180 until it is determined that the turbine rotation speed Nt has become equal to or higher than the synchronous rotation speed of the intermediate gear position. When it is determined in S160 that Condition (B) is satisfied, an affirmative determination is immediately made in S180.

When it is determined in S180 that the turbine rotation speed Nt has become equal to or higher than the synchronous rotation speed of the intermediate gear position (S180: YES), the control device 100 determines whether the current synchronous prediction time CT is equal to or less than the determination value B (S190). The magnitude of the determination value B is preset so that it can be appropriately determined that the timing is suitable for starting the reduction in the rising speed Ntd of the turbine rotation speed Nt during shifting operation based on the fact that the synchronous prediction time CT has become equal to or less than the determination value B.

The control device 100 repeatedly executes the process of S190 until it is determined that the synchronous prediction time CT is equal to or less than the determination value B. When it is determined in S190 that the synchronous prediction time CT is equal to or less than the determination value B (S190: YES), the control device 100 executes a process of temporarily increasing the engaging pressure of the second engaging element establishing the intermediate gear position (S200). With this process of S200, the second engaging element establishing the intermediate gear position is temporarily engaged. In S200, the control device 100 executes feedback control on the indicated pressure Cp of the second engaging element establishing the intermediate gear position so that the rising speed Ntd of the turbine rotation speed Nt becomes a specified value.

Next, the control device 100 determines whether the current synchronous prediction time CT is equal to or less than the determination value C (S210). The magnitude of the determination value C is preset so that it can be appropriately determined that the current turbine rotation speed Nt is approaching the synchronous rotation speed of the post-shifting gear position and the timing is suitable for starting the following process of S220 in which the establishment of the post-shifting gear position is completed based on the fact that the synchronous prediction time CT has become equal to or less than the determination value C.

Then, the control device 100 repeatedly executes the process of S210 until it is determined that the synchronous prediction time CT is equal to or less than the determination value C. When it is determined in S210 that the synchronous prediction time CT is equal to or less than the determination value C (S210: YES), the control device 100 releases the second engaging element establishing the intermediate gear position and engages the second engaging element establishing the post-shifting gear position to execute the process of completing the establishment of the post-shifting gear position (S220). In S220, in order to appropriately replace the second engaging element M2 establishing the intermediate gear position and the second engaging element F2 establishing the post-shifting gear position, the reduction rate of the indicated pressure Cp for the engaging element M2 and the increase rate of the indicated pressure Cp for the engaging element F2 are adjusted. Subsequently, the engaging element M2 is finally completely released to release the establishment of the intermediate gear position, and the engaging element F2 is completely engaged so as not to cause slippage to fully engage the second engaging element necessary for establishing the post-shifting gear position.

Next, the control device 100 determines whether the establishment of the post-shifting gear position is completed (S230). In S230, the control device 100 determines that the establishment of the post-shifting gear position is completed when the turbine rotation speed Nt is the equal to the synchronous rotation speed of the post-shifting gear position. Then, the control device 100 repeatedly executes the process of S230 until it is determined that the establishment of the post-shifting gear position is completed.

Figure 6:
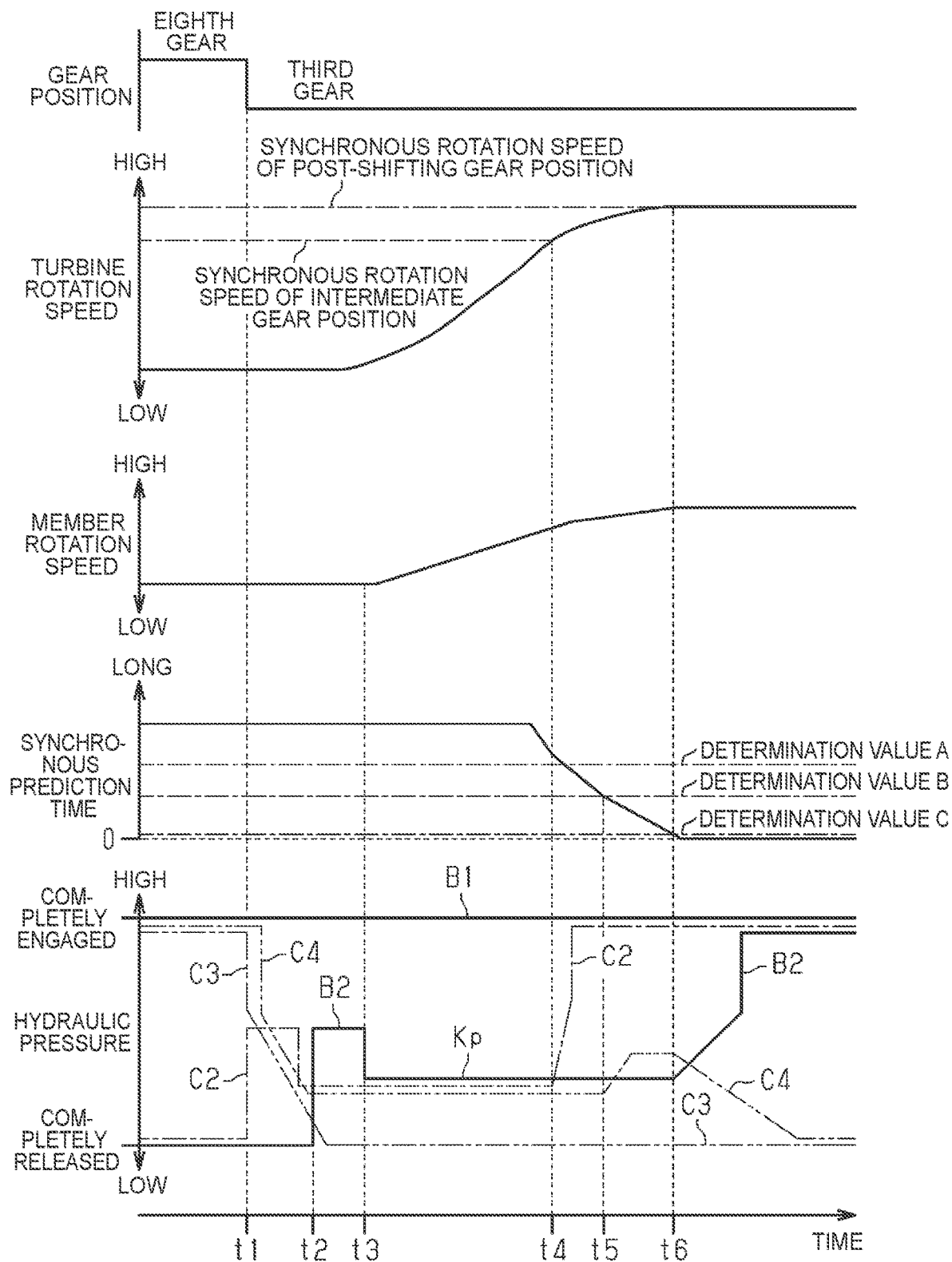
FIG. 6 is a timing chart showing an operation of the same embodiment.

When the control device 100 determines that the establishment of the post-shifting gear position is completed (S230: YES), the control device 100 ends this process. FIG. 6 shows an example of an execution mode of the jump-down shifting described above. Note that FIG. 6 shows an example in which the jump-down shifting is performed from eighth gear to third gear, and the gear position corresponding to the intermediate gear position is fifth gear. In the example shown in FIG. 6, the first engaging element necessary for establishing the intermediate gear position and the post-shifting gear position is the clutch C2, the second engaging element establishing the intermediate gear position is the clutch C4, and the second engaging element establishing the post-shifting gear position and the speed difference reducing element is the brake B2.

Further, the example shown in FIG. 6 shows an operation in the case where, when the two engaging elements establishing the pre-shifting gear position are released, one of the two engaging elements is an engaging element establishing the intermediate gear position, that is, a case where, in the process of S110 shown in FIG. 4, the engaging element (clutch C4) establishing the intermediate gear position is released and brought into a packed state, and the other engaging element (clutch C3) is completely released.

When the jump-down shifting is started at time t1, the process of S110 shown in FIG. 4 is executed so that two of the engaging elements establishing the pre-shifting gear position (eighth gear), namely, the clutch C3 and the clutch C4, are released. Here, the clutch C3, which is not an engaging element establishing the intermediate gear position, is completely released. Further, the clutch C4, which is an engaging element establishing the intermediate gear position, is released until it is brought into a packed state. When the process of S130 is executed, hydraulic pressure is supplied to the clutch C2, which is an engaging element other than the speed difference reducing element among the engaging elements of the intermediate gear position (fifth gear) and the post-shifting gear position (third gear). Thus, the clutch C2 is brought into a packed state.

When the clutch C3 and the clutch C4 are released in this way, the state of the automatic transmission 400 becomes the neutral state, so that the engine rotation speed NE starts to increase. The rotation speed of the input shaft 41 of the torque converter 42 also starts to increase as the engine rotation speed NE increases, and the turbine rotation speed Nt also increases as the rotation speed of the input shaft 41 increases.

Next, when the process of S140 is executed at time t2, the pre-engaging process is executed for the brake B2 which is a speed difference reducing element. When the pre-engaging process is started, the quick apply control is first executed for the brake B2. Then, at the time t3 when the quick apply control is completed and thereafter, the engaging pressure of the brake B2 is maintained at the above-mentioned specified engaging pressure Kp, and the brake B2 is brought into a state where a torque capacity is generated.

When the torque capacity is generated in the brake B2 in this way, the rotation of the second ring gear 422r of the second planetary gear 422 is suppressed. Here, since the second carrier 422c of the second planetary gear 422 rotates together with the output shaft 400o, when the rotation of the second ring gear 422r is suppressed, the rotation speed of the second sun gear 422s is accelerated due to the function of the planetary gear mechanism. By increasing the rotation speed of the second sun gear 422s in this way, the rotation speed of the intermediate member 410 to which the second sun gear 422s is fixed gradually increases at time t3 and after.

Next, at time t4, when the process of S170 is executed with the turbine rotation speed Nt becoming equal to or higher than the synchronous rotation speed of the intermediate gear position, the clutch C2, which is the first engaging element establishing the intermediate gear position (fifth gear) and the post-shifting gear position (third gear), is engaged.

Then, at time t5, when the synchronous prediction time CT becomes equal to or less than the determination value B and the process of S200 shown in FIG. 5 is executed, the engaging pressure of the clutch C4, which is the second engaging element establishing the intermediate gear position (fifth gear), is temporarily increased. Thus, the clutch C4, which has been in the packed state until then, is engaged. When the clutch C4, the clutch C2, and the brake B1 are engaged in this way, the fifth gear, which is the intermediate gear position, is temporarily established, and the torque capacity of the automatic transmission 400 is increased so that the rising speed Ntd of the turbine rotation speed Nt gradually decreases.

Then, at time t6, when the process of S220 is executed with the synchronous prediction time CT becoming equal to or less than the determination value C, the clutch C4, which is the second engaging element establishing the intermediate gear position, is released and the brake B2, which is the second engaging element establishing the post-shifting gear position, is engaged, so that the process of completing the establishment of third gear, which is the post-shifting gear position, is started. When the replacement of the clutch C4 and the brake B2 is completed, the clutch C4 is completely released and the brake B2 is completely engaged, thereby completing the establishment of the post-shifting gear position (third gear).

Figure 7:
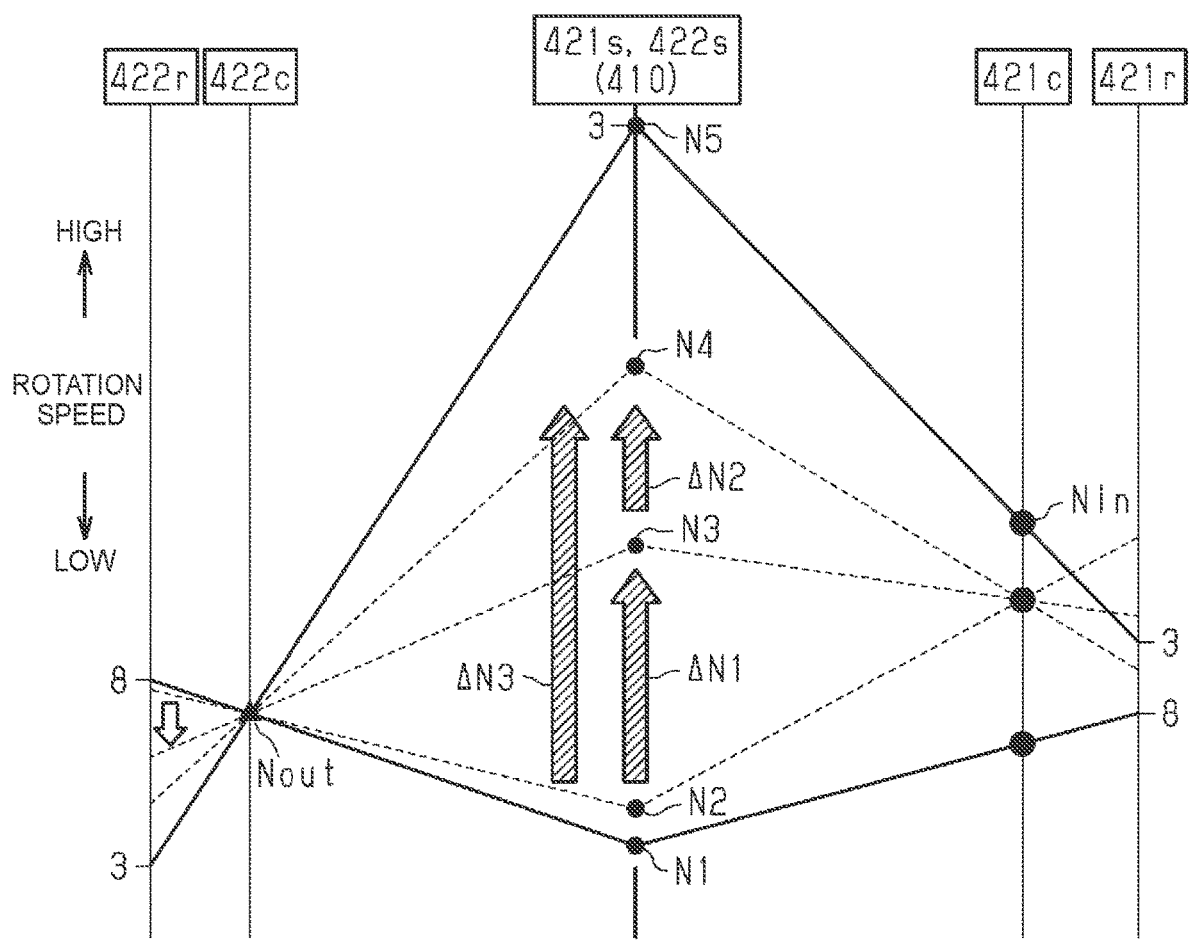
FIG. 7 is a speed diagram showing a rotation speed of each rotating element included in the automatic transmission of the same embodiment.

FIG. 7 shows the operation obtained by the above pre-engaging process. The speed N1 shown in FIG. 7 indicates the rotation speed of the intermediate member 410 when the pre-shifting gear position (eighth gear) is established, that is, the rotation speed of the first sun gear 421s and the second sun gear 422s. The speed N2 indicates the rotation speed of the intermediate member 410 when the clutch C3 and the clutch C4 establishing the pre-shifting gear position are released, and is a speed slightly higher than the speed N1. The speed N4 indicates the rotation speed of the intermediate member 410 when the clutch C2, which is the first engaging element establishing the intermediate gear position (fifth gear), is engaged, and is a speed higher than the speed N3 and the speed N2 described above. The speed N5 indicates the rotation speed of the intermediate member 410 when the post-shifting gear position (third gear) is established, and is a speed higher than the speed N4. The speed difference ΔN1 indicates the difference between the speed N4 and the speed N2 (ΔN1=speed N4−speed N2). The speed difference ΔN2 indicates the difference between the speed N3 and the speed N2 (ΔN2=speed N3−speed N2). The speed difference ΔN3 indicates the difference between the speed N4 and the speed N3 (ΔN3=speed N4−speed N3). Further, Nin indicates the rotation speed of the input shaft 400i of the automatic transmission 400, and Nout indicates the rotation speed of the output shaft 400o of the automatic transmission 400.

First, after the clutches C3 and C4 establishing the pre-shifting gear position are released and until the clutch C2, which is an engaging element establishing the intermediate gear position, is engaged, there is a rotation speed difference between the two rotating bodies connected by the clutch C2, that is, between the intermediate member 410 and the third sun gear 423s included in the Ravigneaux planetary gear mechanism 425. More specifically, the rotation speed of the intermediate member 410 is lower than that of the third sun gear 423s.

When a torque capacity is generated in the brake B2 by executing the pre-engaging process, the rotation speed of the intermediate member 410 is increased as described above. Therefore, when the pre-engaging process is executed after the clutch C3 and the clutch C4 are released, the rotation speed of the intermediate member 410 increases from the speed N2 to the speed N3, as shown in FIG. 7.

Then, when the clutch C2, which is the first engaging element establishing the intermediate gear position, is engaged, the rotation speed of the intermediate member 410 increases from the speed N3 to the speed N4. Here, when the above pre-engaging process is not executed, the rotation speed of the intermediate member 410 at the start of the engagement of the clutch C2 is the speed N2, and thus is lower than the speed N4, which is the rotation speed of the intermediate member 410 when the clutch C2 is engaged, by the speed difference ΔN1. Therefore, at the start of the engagement of the clutch C2, the rotation speed difference between the intermediate member 410 and the third sun gear 423s is increased by the speed difference ΔN1.

On the other hand, in the present embodiment, since the pre-engaging process is executed prior to the engagement of the clutch C2 establishing the intermediate gear position, the rotation speed of the intermediate member 410 at the start of the engagement of the clutch C2 is the speed N3, which is higher than the speed N2 by the speed difference ΔN2. Thus, at the start of the engagement of the clutch C2, the rotation speed difference between the intermediate member 410 and the third sun gear 423s is reduced by such a speed difference ΔN2. Therefore, as compared with the case where the pre-engaging process is not executed, the occurrence of a shifting shock can be suppressed even when the establishment of the intermediate gear position is started earlier.

According to the present embodiment described above, the following operations and effects can be obtained.

(1) Since the above-mentioned pre-engaging process is executed prior to the establishment of the intermediate gear position, the rotation speed difference of the two rotating bodies connected by the engaging elements establishing the intermediate gear position (intermediate member 410 and third sun gear 423s) is reduced. Thus, as compared with the case where the pre-engaging process is not executed, the occurrence of a shifting shock can be suppressed even when the establishment of the intermediate gear position is started earlier. This makes it possible to shorten the shifting time of the intermediate gear position while suppressing the occurrence of a shifting shock.

(2) In the case where the pre-engaging process is executed when the engaging elements establishing the post-shifting gear position do not include the speed difference reducing element, it is necessary to control the speed difference reducing element in addition to the engaging elements necessary for establishing the post-shifting gear position. In this regard, in the present embodiment, when it is determined that the engaging elements establishing the post-shifting gear position include the speed difference reducing element (S120: YES in FIG. 4), the pre-engaging process is executed (S140 in FIG. 4). Therefore, it is possible to reduce the number of engaging elements that need to be controlled when executing the shifting control.

(3) When the rotation speed of the input shaft 400i of the automatic transmission 400 is equal to or higher than the synchronous rotation speed of the intermediate gear position, the rotation speed difference of the two rotating bodies whose relative rotation is regulated by the engaging elements establishing the intermediate gear position is small enough to suppress the occurrence of a shifting shock. In view of this, in the present embodiment, when the turbine rotation speed Nt rotating at the same speed as the input shaft 400i of the automatic transmission 400 becomes equal to or higher than the synchronous rotation speed of the intermediate gear position (S160: YES in FIG. 4), the process of S170 above is executed to start the establishment of the intermediate gear position. Therefore, the occurrence of a shifting shock when establishing the intermediate gear position can be further suppressed.

The present embodiment can be modified to be implemented as follows. The present embodiment and modifications described below may be carried out in combination within a technically consistent range.

By omitting S120 and S150 shown in FIG. 4, when there is a request for the jump-down shifting, the pre-engaging process may be executed regardless of the engaging elements of the post-shifting gear position. Even in this case, operations and effects other than the above (2) can be obtained.

The structure of the hybrid vehicle shown in FIG. 1 is merely an example, and a hybrid vehicle having another structure may be used.

The jump-down shifting process may be performed not only on the automatic transmission 400 mounted on the hybrid vehicle but also on the automatic transmission 400 of a vehicle equipped with only the internal combustion engine 10 without the electric motor 30.

As long as it is possible to perform the same process as the jump-down shifting process described above, the number of engaging elements necessary for establishing the gear position and the number of engaging elements to be released at the start of the jump-down shifting may be changed as appropriate.

The control device 100 is not limited to the one that includes the CPU 110 and the memory 120 and executes software processes. For example, the control device 100 may include a dedicated hardware circuit (for example, an application specific integrated circuit (ASIC), etc.) that executes at least part of the software processes executed in each embodiment described above. That is, the control device 100 only needs to have any of the following configurations (a) to (c).

(a) A configuration including a processing device that executes all of the above processes according to a program and a program storage device such as a memory for storing the program (b) A configuration including a processing device that executes part of the above processes according to a program, a program storage device, and a dedicated hardware circuit that executes the remaining processes (c) A configuration including a dedicated hardware circuit that executes all of the above processes Here, the above configurations may have a plurality of software processing circuits including a processing device and a program storage device and a plurality of dedicated hardware circuits. That is, the processes only need to be executed by a processing circuit including at least one of one or more software processing circuits and one or more dedicated hardware circuits.

What is claimed is:

1. A control device for an automatic transmission,
the control device being applied to a planetary gear automatic transmission that has a plurality of friction engaging elements switchable between an engaged state and a released state, and that changes a gear position by changing an engaging element to be brought into the engaged state among the friction engaging elements, wherein
when a jump-down shifting is executed, the control device executes shifting control in which, after engaging elements establishing a pre-shifting gear position are released, an intermediate gear position that is a gear position between the pre-shifting gear position and a post-shifting gear position is established, and after the intermediate gear position is established, the post-shifting gear position is established, and
when an engaging element able to reduce a rotation speed difference between two rotating bodies connected by engaging elements establishing the intermediate gear position is regarded as a speed difference reducing element, the control device executes a pre-engaging process for generating a torque capacity in the speed difference reducing element while the shifting control is being executed and before establishing the intermediate gear position.

2. The control device according to claim 1, wherein the pre-engaging process is executed on condition that engaging elements establishing the post-shifting gear position includes the speed difference reducing element.

3. The control device according to claim 1, wherein when a rotation speed of an input shaft of the automatic transmission connected to an output shaft of an internal combustion engine becomes equal to or higher than a synchronous rotation speed of the intermediate gear position, a process of starting establishment of the intermediate gear position is executed.

* * * * *